Nov. 30, 1937.   H. STYRI   2,100,725
LOCKING DEVICE FOR ATTACHING A PART HAVING A BORE TO A SHAFT
Filed Feb. 18, 1936   2 Sheets-Sheet 1
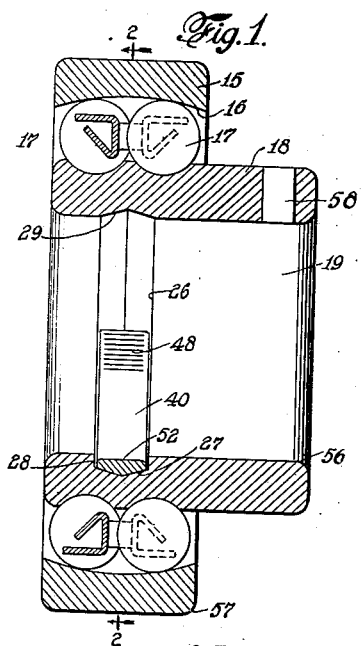
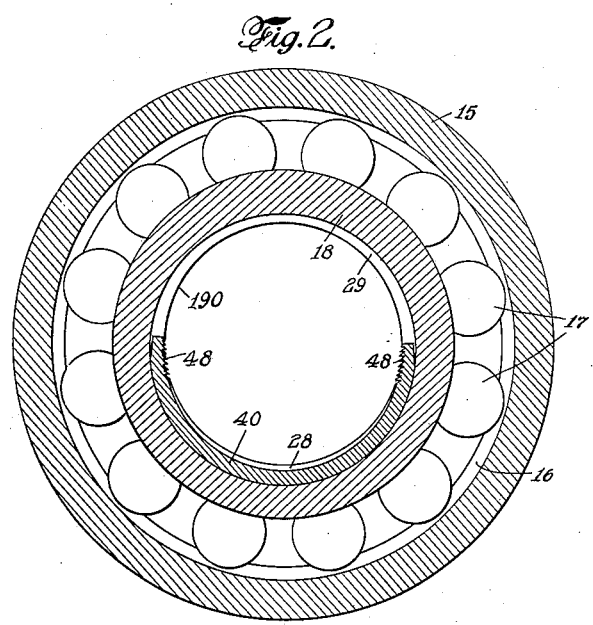
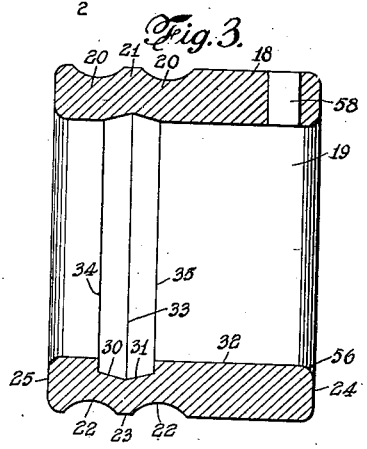
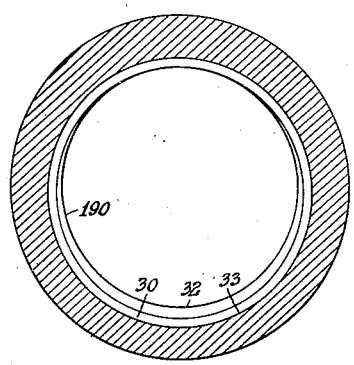
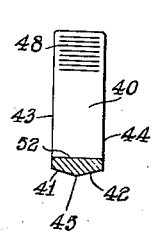
INVENTOR.
Haakon Styri
BY
ATTORNEY.

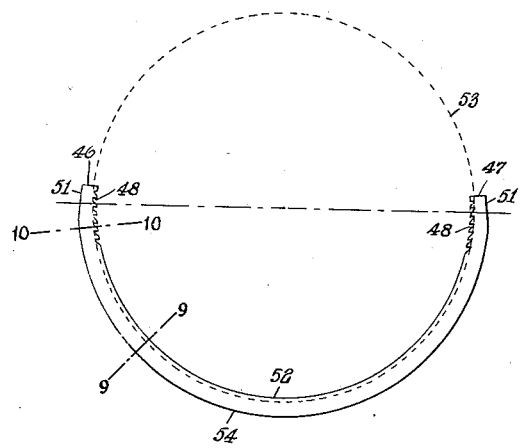
Fig. 8.
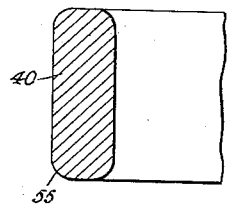
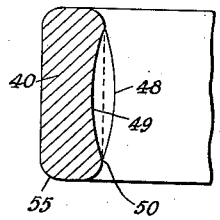
Fig. 9.  Fig. 10.
INVENTOR.
Haakon Styri Patented Nov. 30, 1937

2,100,725

UNITED STATES PATENT OFFICE 2,100,725

LOCKING DEVICE FOR ATTACHING A PART HAVING A BORE TO A SHAFT

Haakon Styri, Philadelphia, Pa., assignor to S K F Industries, Incorporated, Philadelphia, Pa., a corporation of Delaware Application February 18, 1936, Serial No. 64,471

12 Claims. (Cl. 308—236)

This invention relates to locking devices for attaching a part having a bore to a shaft and has for an object to provide means carried by the part and located within the bore which, after application of the part to a shaft upon relative rotation of the part and shaft securely lock these together.

Another object of the invention is to provide a device for attaching a part having a substantially cylindrical bore on a substantially cylindrical shaft and holding the parts together against relative angular and axial movement.

Another object of the invention is to provide a device of this character with locking means which permit the introduction of a shaft within the bore of a machine part and which permit relative axial adjustment of the parts and which afford means for locking the part on the shaft by means of a slight relative angular movement, the locking device being so organized that upon slight relative axial movement of the parts, the locking tendency of the locking member is augmented.

A further object of the invention in connection with this last mentioned object is to so proportion the parts that the augmented locking of the parts upon such relative axial movement shall be arrested before the parts bind to the point where they cannot be separated when desired or when injury will be done to them.

Another object of my invention is to provide means for attaching the inner ring of a two-row ball bearing on a shaft by means of an eccentric groove formed within the bore of the bearing, the groove being formed between the two rows of balls, or expressed differently, the groove is located in the bore at a position midway between the raceways formed in such ring, such groove being located below the land between such raceways.

Another object of the invention is to provide a groove in the bore of the inner ring of a two-row ball bearing, the center portion of such groove being deeper than its sides and locating such groove in the median position in respect to the ball raceways, such organization bringing the deepest part of the groove in the bore of the bearing directly below the center land.

Such deeper portion of a preferred form of the invention being pointed in cross section representing two flat cones set base to base; the form of the groove however, being that of two flat truncated hollow cones set base to base.

Another object of the invention is to form a locking shoe for a device of this character with raised shaft engaging elements adjacent its ends.

Another object of the invention is to cut the shaft engaging face of the ends somewhat like a file, the teeth however, fading out toward the sides.

Another object of the invention is to form a socket in the machine part preferably at the side having the shallowest part of the eccentric groove for the introduction of a tool for reversely rotating the part to release the locking device and enable its removal from the shaft.

Another object of the invention is to form a locking shoe of this character having rounded sides or corners to facilitate the application of the device to a shaft.

Another object of the invention is to form teeth on a locking shoe, the teeth having their ends near the edges of the shoe formed to facilitate the application of the shoe to a shaft.

Another object of this invention is to form a groove having an eccentric bottom in the bore of a machine part intended for application to a shaft and a shoe seated in such groove, the ends of the shoe being adapted to engage the shaft. The shoe preferably being formed of springy material, as for instance, spring tempered steel, and formed on a curvature, the curve of the inner face being of less radius than the radius of the shaft and the curve of the outer surface being of greater radius than the bore of the machine part.

Another object of the invention is to provide a shoe of this general character having engaging teeth at its ends, the outer surface of the shoe being relieved at the ends. Other details and advantages of the device appear in the descriptive portion of the specification.

In the drawings accompanying this specification, one practicable embodiment of my invention is illustrated, in which drawings—

Figure 1 is a central longitudinal section of a machine part in the form of a ball bearing having the inner ring constructed in accordance with this invention.

Figure 2 is a cross section of the device taken at about the plane of the line 2—2 of Figure 1 looking in the direction of the arrow.

Figure 3 is a longitudinal section of the inner bearing ring having been removed from the parts associated with it in Figure 1, the locking shoe also having been removed from the eccentric groove in the bore of this ring.

Figure 4 is a view partly in cross section taken at about the plane of the land between the ball raceway grooves of the inner ring and partly an end view of the ring shown in Figure 3 looking at this from the right hand side.

Figure 5 is a section of the locking shoe assuming that this has been removed from the Figure 3 illustration.

Figure 6 is an end view of the locking shoe.

Figure 7 is an enlarged cross sectional view of the locking shoe showing a preferred form of the file teeth.

Figure 8 is an edge elevation of a ring or shoe shown on a larger scale than is the scale of the other figures of the drawings. This view is somewhat diagrammatic for the purpose of showing the relation of the curved inner and outer surfaces of the shoe in relation to the perimeter of the shaft and the perimeter of the bore of the machine part, and Figures 9 and 10 are cross sections taken at about the planes indicated by the lines 9—9 and 10—10 respectively of Figure 8 but on a larger scale.

The machine part selected for the purpose of illustrating my invention is a two-row self-aligning ball bearing having an outer ring 15 formed interiorly with a hollow spherical face 16 which surface serves as the self-aligning race way for the sets of balls 17.

The shaft receiving member of the device is represented by a ring 18 having a bore 19 and outwardly of the bore it is formed with two thin portions 20—20 disposed upon the sides of a thicker portion 21. In the illustration this is represented by an inner member which is shown as the inner ring of a bearing having two grooves or raceway tracks 22 in which the balls may run. Between these raceway grooves 22—22 there is shown a land 23. The inner ring of the bearing illustrated is of the extended race type, that is it projects at one end indicated at 24 much further from the center land 23 than the projection of the other end 25.

This is a type of bearing which is used quite extensively in line shaft hanger boxes; the problem being to hold the inner race ring 18 on the shaft against angular movement and against axial movement. The bore 19 of the ring 18 is throughout its greater portion, smooth and cylindrical. The device is intended to be mounted on a shaft by entering the end of the shaft in the bore 19, the bearing then being moved along until it reaches the desired position in relation to the support for the outer ring 15 which support may be a line shaft hanger.

There is shown formed within the bore of the ring 18 a groove 26 having an eccentric bottom 27. The groove has a deep side 28 represented at the lower part of the figures of the drawings showing the inner ring, and a shallow side 29 represented at the upper part of those same figures. The form of the groove illustrated is that represented by two hollow truncated cones of small cone angle set base to base. The longitudinal section of the ring, which is taken crosswise of the groove, shows the groove as having two shallow or tapering sides 30 and 31 at a rather small angle to the line 32 representing the bore of the inner ring. These tapering faces 30 and 31 meet at a line designated by 33. Throughout most of the portion of the groove it has appreciable shoulders designed by the reference characters 34 and 35 at its respective sides.

In Figures 1 and 2, a keeper or locking shoe 40 is shown mounted in the groove. The keeper by itself is shown in elevation in Figure 6, and in section of Figure 5. One purpose of including Figure 5 is to afford space for applying reference characters to its various surfaces. It is shown as having conical faces 41 and 42 for mating with the faces 30 and 31 respectively of the groove 26. It is also shown as having side faces 43 and 44 adapted in certain positions of the device to abut one or the other of the faces 34 and 35 of the groove 26. It is to be noted particularly in Figure 1 when the lock or shoe member is located in the groove that there is clearance between the side faces of the keeper and the side faces of the groove, especially when the crest 45 between the faces 43 and 44 is well up in the deepest portion 33 of the groove.

The bore of the ring 18 is intended to have a sliding fit on the shaft to which it is applied. For the purpose of this description it will be assumed that the perimeter of the shaft will approximate the perimeter of the bore of the ring, consequently in Figures 2 and 4 the same circular line 190 may be regarded as representing the meeting surfaces of those two perimeters.

To assist one or the other end of the keeper in seizing the shaft and being by the relative rotation of the ring 18 and the shaft brought up into a shallower part of the groove, the inner faces of the ends of the shoe are roughened. In the illustration the ends 46 and 47 are shown roughened by having formed thereon raised teeth 48. These teeth are somewhat of the nature of file teeth and may be struck up as in Figures 7 and 10 by some tool having a rounded end which makes a depression somewhat as illustrated by the line 49 in those figures. This gives a projecting tooth effect fading out at the ends as represented at 50.

The outer faces of the shoe are illustrated relieved as at 51 for the purpose of facilitating and augmenting the wedging action when either of the ends of the lock shoe or keeper is moved into a shallower portion of the groove.

The shoe is preferably between 180° and 190° long.

The inner surface 52 of the shoe is curved on a radius somewhat smaller than the radius of the shaft. In Figure 8 the perimeter of the shaft is represented by the light line 53. A substantial portion of the outer surface 54 of the shoe lies beyond the cylindrical portion of the bore 19 of the ring, consequently when the shoe is located in the groove it will not fall out of the groove. It will be seen by reference to Figures 9 and 10 that the corners of the shoe, one of which is indicated by the reference character 55, are curved or formed on a radius somewhat after the practice in forming radii as 56 and 57 on the corners of the bearing rings which are respectively to engage the shaft and the housing.

Assuming a device if constructed as herein illustrated and the ring 18 turned into a position which brings the deeper part of the eccentric groove lowermost, the lock or keeper shoe ordinarily assumes a position by gravity at the lowermost part of the device and in such deepest part of the groove or it may be placed there by hand. The end of the shaft to which the ring is to be applied is then entered into the bore 19 of the ring, or what is the same thing, the ring is applied to the shaft by being mounted upon it. The ring is then slid along the shaft to its desired location, for instance until the outer race ring 15 has reached the position at which a hanger housing for its reception is located. In many instances bearings are mounted in hanger housings and the whole assembly is slid along the shaft until the position of the hanger is reached.

The rounded ends 50 of the file teeth 48 facilitate the entrance of the shaft into the bore of the ring and facilitate the movement of the shaft within the shoe during the mounting of the device. When the ring has reached its predetermined position on the shaft, a slight relative rotative movement of it, in either direction, causes the file teeth 48 which extend outwardly beyond the surface 52 of the body of the shoe to bite into the shaft and move the shoe within the groove. This movement causes one end of the shoe to move into a shallower part of the groove which causes a further biting of the teeth on that end, the other end of the shoe of course moving into a deeper portion of the groove and freeing itself from the shaft. The relief at 51 of the active end of the shoe assists in the wedging action of this end into the shallower portion of the groove.

End thrust of the shaft after the shoe has been moved into its locking position still further clamps the shoe against the shaft owing to the wedging action. The running up of the conical faces 30 or 31 of the groove 26 onto the conical faces 41 or 42 of the shoe and consequent overloading or jamming of the parts is prevented by having only a slight amount of clearance between the sides 34 and 35 of the groove and the sides 43 and 44 of the shoe. Another result is accomplished by having between these side faces but a narrow clearance, so that any tendency of the shoe to cant or tip will be corrected.

A releasing socket or cavity is represented at 58. This is preferably disposed opposite the deeper portion of the eccentric groove.

When it is desired to release the ring from the shaft, either for the purpose of removing it or changing its position, some tool is inserted in the hole 58 and the ring reversely rotated on the shaft, the biting action of the shoe being released sufficiently to permit the shifting of the ring.

Of course it is to be understood that the device herein shown in the drawings and described is illustrative of my invention and that changes may be made within the scope of the claims without departing from the spirit of my invention.

Having thus described my invention, I claim and desire to secure by Letters Patent—

1. A bearing inner member having a shaft receiving bore, outwardly of the bore there being two thin portions disposed upon the opposite sides of a thicker portion, and a groove being formed in the bore face having its bottom disposed eccentrically in relation thereto and located inwardly of the said thicker portion, and a lock shoe fitting the said groove and formed with shaft biting portions.

2. A bearing inner member having a shaft receiving bore, outwardly of the bore there being two thin portions disposed upon the opposite sides of a thicker portion, and a groove being formed in the bore face disposed eccentrically in relation thereto, and located inwardly of the said thicker portion, and a shoe formed as a segment of a ring for fitting the said groove and adapted to lie in the deeper portion thereof and having at its ends shaft biting portions.

3. A bearing inner member having a shaft receiving bore, outwardly of the bore there being two thin portions disposed upon the opposite sides of a thicker portion, and a groove being formed in the bore face disposed eccentrically in relation thereto, and located inwardly of the said thicker portion, and a lock shoe for lying within the deeper portion of the groove, such shoe being over 180° long and roughened at each of its ends for biting a shaft entering the said bore.

4. A bearing inner member having a shaft receiving bore, outwardly of the bore there being two thin portions disposed upon the opposite sides of a thicker portion, and a groove being formed in the bore face disposed eccentrically in relation thereto, and located inwardly of the said thicker portion, a shoe, the ends of the shoe where intended to engage a shaft entering the bore, being formed with teeth rounded at their ends, the ends of the shoe upon the groove engaging side being relieved, whereby upon the movement of an end of the shoe into a shallower portion of the groove in the act of biting the shaft upon relative rotation of the parts the wedging action of the shoe against the bottom of the groove is augmented.

5. A machine element having a shaft receiving bore, outwardly of the bore there being two thin portions disposed upon the sides of a thicker portion, and a groove being formed in the bore face disposed eccentrically in relation thereto, the bottom of the groove having the form of two hollow cones set base to base, the meeting plane of the bases being located inwardly of the said thicker portion, and a lock shoe having the form of two hollow cones set base to base, the cone angles of the lock shoe and of the groove being similar.

6. A machine element having a shaft receiving bore, and a groove being formed in the bore face disposed eccentrically in relation thereto, the bottom of the groove having the form of two hollow cones set base to base, and a lock shoe having the form of two hollow cones set base to base, the cone angles of the lock shoe and of the groove being similar.

7. A machine element having a shaft receiving bore, and a groove being formed in the bore face disposed eccentrically in relation thereto, and a lock shoe for lying within the deeper portion of the groove, such shoe being over 180° long and roughened at each of its ends for biting a shaft entering the said bore, the inner surface of the shoe being curved on a radius less than the radius of the contemplated shaft, the shoe extending outwardly beyond the surface of the said bore.

8. A machine element having a shaft receiving bore, outwardly of the bore there being two thin portions disposed upon the sides of a thicker portion, and a groove being formed in the bore face disposed eccentrically in relation thereto, the bottom of the groove having the form of two hollow cones set base to base, the meeting plane of the bases being located inwardly of the said thicker portion, and a lock shoe having the form of two hollow cones set base to base, the cone angles of the lock shoe and of the groove being similar, the width of the shoe being narrower than the width of the groove axially of the element for augmenting the clamping action of the shoe upon the shaft due to axial thrust.

9. A machine element having a shaft receiving bore, and a groove being formed in the bore face disposed eccentrically in relation thereto, the bottom of the groove having the form of two hollow cones set base to base, and a lock shoe having the form of two hollow cones set base to base, the cone angles of the lock shoe and of the groove being similar, the width of the shoe being narrower than the width of the groove axially of the element for augmenting the clamping action of the shoe upon the shaft due to axial thrust.

10. A bearing inner member having a shaft receiving bore, and two raceways disposed upon the opposite sides of a land portion, and a groove being formed in the bore face disposed eccentrically in relation thereto, the bottom of the groove having the form of two hollow cones set base to base, the meeting plane of the bases being located inwardly of the said land portion.

11. A machine element having a shaft receiving bore and formed outwardly thereof with one or more load carrying portions, there being a groove formed in the bore face in the region of the lines of force running from the working face or faces thereof to the shaft, the bottom of such groove having shallow or tapering sides and being disposed eccentrically in relation to the bore, and a lock shoe located in the groove and having faces mating with the bottom faces respectively of the groove, the width of the shoe being narrower than the width of the groove axially of the machine element for augmenting the clamping action of the shoe upon the shaft due to axial thrust.

12. A machine element having a shaft receiving bore and formed outwardly thereof with one or more load carrying portions, there being a groove formed in the bore face in the region of the lines of force running from the working face or faces thereof to the shaft, the bottom of such groove having shallow or tapering sides and being disposed eccentrically in relation to the bore, and a lock shoe located in the groove and having faces mating with the bottom faces respectively of the groove, the width of the shoe being narrower than the width of the groove axially of the machine element for preventing the said machine element from walking lengthwise of the shaft.

HAAKON STYRI.